Feb. 16, 1954　　C. G. HÅRD AF SEGERSTAD　　2,669,246
PNEUMATIC CONTROL AND/OR MEASURING MEANS
Filed April 29, 1948　　　　　　　　　　　　2 Sheets-Sheet 1

INVENTOR.
Carl Gustaf Hård Af Segerstad
BY
Hauntine, Lake & Co.
AGENTS

Feb. 16, 1954  C. G. HÅRD AF SEGERSTAD  2,669,246
PNEUMATIC CONTROL AND/OR MEASURING MEANS
Filed April 29, 1948  2 Sheets-Sheet 2

INVENTOR.
Carl Gustaf Hård Af Segerstad
BY
Haseltine, Lake & Co.
AGENTS

Patented Feb. 16, 1954

2,669,246

UNITED STATES PATENT OFFICE 2,669,246

PNEUMATIC CONTROL AND/OR MEASURING MEANS

Carl Gustaf Hård af Segerstad, Sandviken, Sweden

Application April 29, 1948, Serial No. 24,007

Claims priority, application Sweden April 30, 1947

8 Claims. (Cl. 137—82)

1

The invention relates to a control or measuring means as described in the Swedish Patent No. 117,419 with two pressure chambers which are adapted to be connected to one and the same compressed air source and which have throttled inlets and outlets at least one of which is controllable in dependence on a certain quantity. This pressure differential is to vary in dependence upon the said quantity and is intended for the actuation of an indicating, recording, controlling or adjusting device, responsive to said pressure differential. In order to obtain this pressure differential between the pressure chambers, a pressure responsive member is adapted to be actuated by the pressure in either pressure chamber or in both pressure chambers and is adapted to control at least one of the aforementioned inlets or outlets in such a manner that the pressure differential employable for the actuation of the aforesaid pressure differential responsive device is reproduced or amplified.

The present invention relates to improvements of the device indicated above. These improvements may be applied either separately or jointly.

One improvement consists therein that for establishing a reproduced or amplified pressure differential available for actuation of said pressure differential responsive device, the pressure responsive member is adapted to control a control passage, this differential being produced, on the one hand, by the pressure in one of the pressure chambers, and, on the other hand, by means of said control passage.

Another improvement consists therein that at least one of the pressure chambers is provided with an additional inlet and/or outlet which is adjustable manually.

Both improvements make possible such an adjustment of the apparatus that the pressures in the pressure chambers are equal at a certain value of the quantity to be measured, and vary in an equal degree in opposite directions when the quantity to be measured deviates from the said value.

Figure 1:
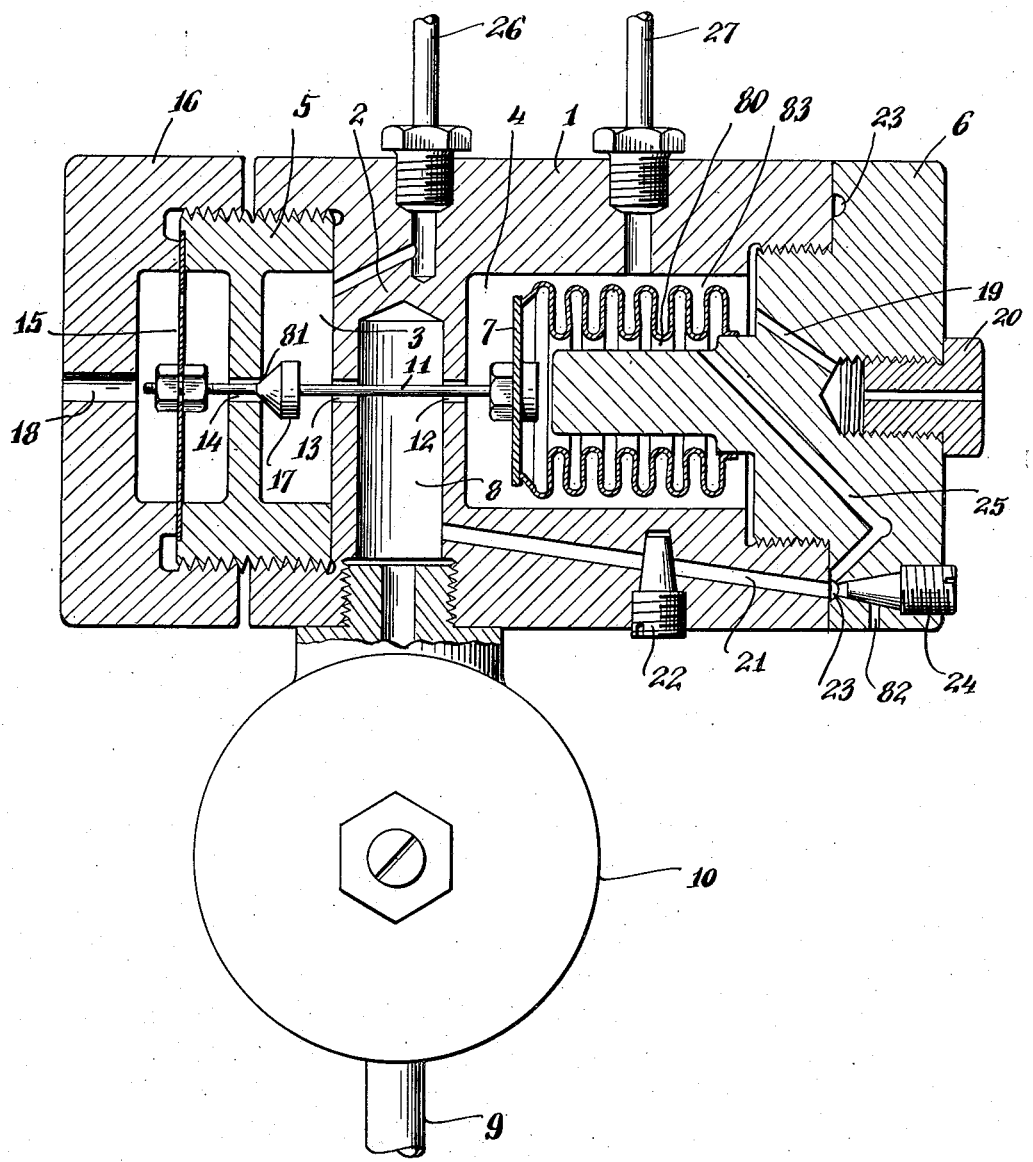
Figure 2:
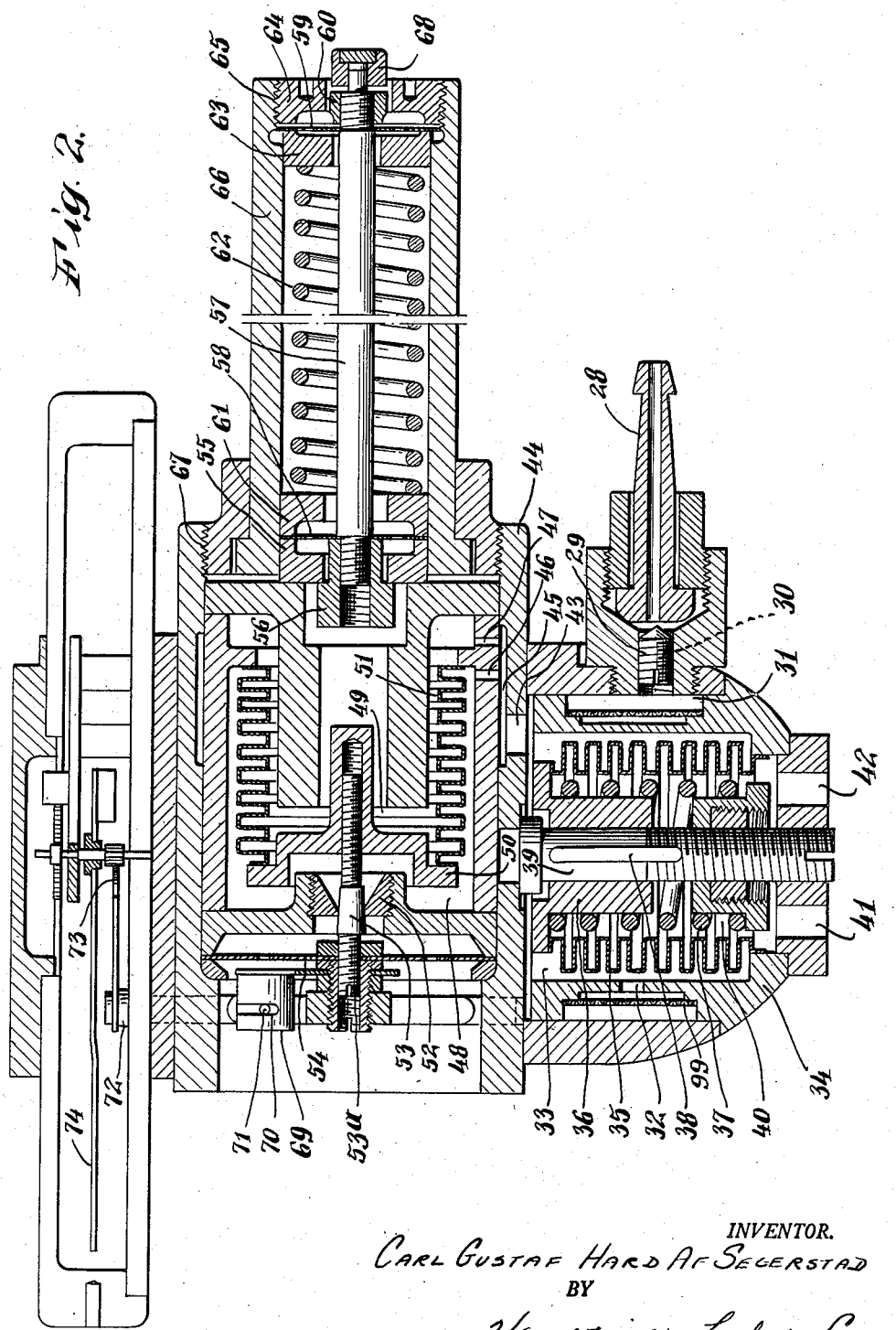

Two forms of an apparatus embodying the invention are illustrated in Figs. 1 and 2 respectively on the accompanying drawing. The apparatus shown in Fig. 1 has a body 1 in the form of a cylinder with a partition 2 separating a chamber 3 from a pressure chamber 4 closed by a cover sleeve 5 and an end piece 6, respectively. In the partition 2 is a bore 8 communicating with a compressed air pipe 9 via a constant pressure regulator 10 not shown in detail. On the inner side of the end piece 6 is fixed a bellows 7 which

2 subdivides the pressure chamber 4 into two spaces, an outer space 83 which in the example of Fig. 1 is the "pressure space" and an inner space 80 which is the "counter pressure space." The head of the bellows is connected with one end of a valve rod or stem 11 extending across the bore 8 and the chamber 3 through bores 12, 13 in the partition 2 and through a passage 14, in the following specification and claims designated as "control passage," in the cover sleeve 5. The end of stem 11 is fixed to and guided by a flat spring in the form of a perforated membrane or diaphragm 15 the periphery of which is fixed between the sleeve 5 and cap nut 16. The bores 12, 13 constitute the inlets for the compressed air from the bore 8 to the pressure chamber 4 and the chamber 3 respectively. The valve rod carries a valve body 17 in the chamber 3, the said valve body cooperating with a seat 81 at the opening of the control passage 14 into space 3. The other opening of the control passage 14 communicates with the atmosphere via the openings in the perforated membrane or diaphragm 15 and a duct 18 in the cap nut 16. Via a channel 19 bored in the end piece 6 the pressure space 4 communicates with an outlet nozzle 20. In order to obtain an adjustable counter pressure in the counter pressure space 80, the body 1 is provided with a bore 21 equipped with a throttle valve 22, said bore 21 connecting the bore 8 with an annular groove 23 in the end piece 6. The said annular groove, in its turn communicates with the atmosphere via a port 82 controlled by throttle valve 24 as well as with the counter pressure space 80 via a channel 25. Finally, the chambers 3 and 4 communicate by means of their respective pipe lines 26, 27, each with one side of a differential-pressure sensitive device not shown.

The described apparatus is intended to be used e. g. for measuring the thickness of a metal strip which is being fed over a support located opposite the opening of the nozzle 20 and at a fixed distance from said nozzle, there being formed a space between the nozzle and the metal strip, the width and thus also the flow resistance of which vary in accordance with the thickness of the strip.

The device operates as follows: Suppose that initially the pressure in chamber 3 is equal to the pressure in pressure space 83 and that this condition is disturbed by an increase of the flow resistance of the testing air current emitted from the nozzle 20, resulting in a corresponding increase of the pressure in the pressure space 83. The pressure in the pressure space prevails over the pressure in the counter pressure space and compresses the bellows 7. Movement of the head of the bellows will displace the valve body 17 to the right. A certain quantity or an increased quantity of air now escapes from chamber 3 through the control passage 14 to the chamber of low pressure or to the outside whereby the pressure in the chamber 3 is reduced. The device should suitably be dimensioned in such a manner that the said pressure reduction is equal to the pressure increase in the pressure chamber 4.

The counter pressure in the space 80, the interior of the bellows 7, can be adjusted to a suitable value by means of the throttle valves 22 and 24. In order to adjust the apparatus still another possibility of regulation may be arranged for, by connecting one of the spaces under pressure, e. g. chamber 3, with the bore 8 and/or with the atmosphere via an additional inlet and outlet respectively provided with manually adjustable throttle valves.

In the embodiment shown in Fig. 2 the pressure medium is supplied through the nipple 28 and is throttled by the adjustable screw 29, and passes through a passage 30 therein to a ring chamber 31 and thence through a duct 32 to the chamber 33 in the casing 34. Mounted within the ring chamber 31 there is a cylindrical filter screen 99 for filtering the pressure medium on its way to the duct 32. A bellows 35, 36 is compressed, against the tension of a spring 37, under the pressure of the compressed air admitted through 28, 30, 31, 32 and 33. If the pressure increases above a certain extent, the bellows is compressed and the downward moving part 36 exposes a greater or smaller part of a groove 38 in the stationary rod 39 on which the part 36 is sliding with a close running fit. With the uncovering of part of the groove 38 a quantity of the pressure medium flows out through the said groove 38 into the chamber 40 and through the ducts 41, 42 to the atmosphere. By this flow the pressure of the pressure medium in the chamber 33 is reduced so that it is kept substantially constant at varying pressures of the pressure medium supplied to the nipple 28.

From the chamber 33 with constant pressure the pressure medium passes through an opening 43 in the body 44 to the ring chamber 45 and thence through the two throttling inlets 46 and 47 of different sizes to the counter pressure space 48 and the pressure space 49 outside and inside respectively of, and thus separated by, the bellows 50, 51. From the counter pressure space 48 the pressure medium may flow out through the control passage constituted by an annular throttled outlet between the annular seat 52 and the conical valve body 53 arranged therein and through openings in the membrane or diaphragm 54, which together with the head 50 of the bellows supports the conical valve body 53. From the pressure space 49 the pressure medium flows through a throttled outlet between the stationary part 55 and the nut 56 which is screwed on to a rod 57 which is carried by two membranes or diaphragms 58 and 59 provided with openings letting through the pressure medium flow.

The inner edges of the membranes 58, 59 are retained on the rod 57 by means of said nut 56 and a nut 60 while the outer edge of the membrane 58 is held fixed between the rings 55, 61 by a spring 62, whose right end, through the intermediary of a ring 63, clamps the outer edge of the membrane or diaphragm 59 against a ring 64 which at 65 is screwed into a tube 66, whose left end is fixed in the casing 44 by means of the threads 67. All the mechanism parts in the tube 66 are kept in their correct positions by the spring so that, when they are to be mounted, they only need be arranged in their proper places within the tube 66 and this tube may then be secured at the body 44 by means of the sleeve screw 67.

The valve body 53 may be adjusted as to its position relatively to the head 50 of the pressure responsive member by means of screw 53a which may be screwed more or less into the hub of head 50. The outlet area between the parts 52 and 53 may thus be adjusted and the normal pressure in the counter pressure space thus set. Rod 57 carries at its outer end a feeler 68 against which the objects, whose movement or dimension is to be measured, are to be pressed. When the feeler 68 is slightly pressed in, the outlet area between the parts 55, 56 is increased whereby the pressure in the pressure space 49 sinks. The bellows 51 is thereby compressed and displaces the conical valve body 53 whereby the outlet area of the counter pressure space 48 or control passage between 52 and 53 is reduced so that the pressure in the said pressure chamber 48 or control passage rises and still more compresses the bellows. To the valve body 53 is fixed a member 69 having a slit engaged by an arm 71 on a shaft 72. On the shaft 72 is fixed a toothed sector 73 which, via a gear transmission, drives a pointer 74 which is movable over a scale and shows the deflection of the valve body 53 on the said scale.

As will be seen from the above description, the bellows serves to drive the pointer and, moreover, it corresponds to the pressure-responsive device 7 in Fig. 1 as it is adapted to be actuated by the pressure in the pressure space 49, on the one hand, and by the pressure acting in the opposite direction in the counter pressure space 48, the pressure in this space being adjustable by the screw 53a which thus corresponds to the pressure control device 22, 24 in Fig. 1. Also in the device according to Fig. 2 one of the spaces under pressure may be provided with an additional, manually adjustable inlet and/or outlet, and the pointer device may of course be replaced by a recording, controlling or adjusting device.

Having now described my invention, what I claim as new and desire to secure by Letters Patent is:

1. Device for control or measuring purposes or both, comprising a pressure chamber, a pressure responsive member disposed in said pressure chamber dividing it into a pressure space and a counterpressure space, inlet conduits connecting each of said spaces to a source of compressed air common to both, throttling means associated with said inlet conduit leading to said counterpressure space to establish a pressure differential between said pressure space and counterpressure space, said pressure responsive member being adapted to be deflected responsive to variations of said pressure differential, a control passage disposed between a first chamber at a relatively low pressure and a second chamber substantially at the pressure of one of said pressure and counterpressure spaces, said inlet conduits also supplying air under pressure to said chamber which is substantially at the pressure of one of said pressure and counterpressure spaces, a rod carried by said pressure responsive member and extended with a loose sliding fit through said control passage, a valve body on said rod for closing said control passage when said pressure responsive member is moved, therewith moving said rod in a direction to seat said valve body against a valve seat at the adjacent end of said control body thereby to increase the pressure differential extant between said second chamber and said one of said pressure and counterpressure spaces proportionally to the variations of said first-named pressure differential.

2. Device as set forth in claim 1, comprising means for supplying to a pressure differential responsive device the pressure differentials of said second chamber and said one of said pressure and counterpressure spaces.

3. Device according to claim 1, comprising an air outlet passage extending from said pressure space to release testing air from said pressure space.

4. Device as set forth in claim 1 wherein a connection with the outside atmosphere is provided in connection with said counterpressure space, means being provided for regulating the passage of the air through said connection.

5. Device as set forth in claim 1 wherein said inlet conduit of the counterpressure space has a connection to the outside atmosphere and is provided with two throttle valves arranged in series, one adapted for throttling the passage of said connection to the atmosphere, at least one of said throttle valves being controllable; said counterpressure space being connected to said conduit at a point intermediate said throttling valves.

6. Device for control or measuring purposes or both, comprising a pressure chamber, a pressure responsive member disposed in said pressure chamber and dividing the latter into a pressure space and a counterpressure space, throttled inlet conduits connecting each of said spaces to a source of compressed air common to both to establish a pressure differential between said pressure space and counterpressure space, outlet conduits connecting each of said spaces to an atmosphere of relatively low pressure, first valve means controlling the communication of said pressure space with the atmosphere of relatively low pressure through the related one of said outlet conduits in response to variations in the characteristic to be measured thereby to vary the pressure differential between the pressures in said spaces, said pressure responsive member moving in response to variation of said pressure differential, and second valve means connected to said pressure responsive member for movement with the latter, said second valve means controlling the communication of said counterpressure space with said atmosphere of relatively low pressure through the other of said outlet conduits and acting inversely to said first valve means to decrease and increase the communication through said other outlet conduit in response to the movements of said pressure responsive member respectively resulting from increasing and decreasing communication of said pressure space with the atmosphere of low pressure whereby said second valve means acts to accentuate the variation of said pressure differential.

7. Device as set forth in claim 6, wherein said second valve means is adjustably connected to said pressure responsive member for movement independent of the latter in the direction varying the communication of said counterpressure space with the atmosphere of relatively low pressure through said other outlet conduit thereby to provide for varying at will the normal pressure differential established between said pressure space and said counterpressure space.

8. Device as set forth in claim 6, wherein said other outlet conduit includes an opening defining a valve seat, and said second valve means includes a conical valve member fitting in said opening so that the annular space between said valve member and seat is varied by axial shifting of said conical valve member, and a threaded valve stem extending axially from said conical valve member and threadably secured to said pressure responsive member so that rotation of said stem serves to axially adjust said conical valve member relative to said seat independent of the movement of said pressure responsive member thereby to vary the normal pressure differential established between said pressure space and said counterpressure space.

CARL GUSTAF HÅRD AF SEGERSTAD.

References Cited in the file of this patent

UNITED STATES PATENTS

| Number | Name | Date |
| --- | --- | --- |
| 2,202,286 | Gorrie | May 28, 1940 |
| 2,248,322 | Annin | July 8, 1941 |
| 2,299,884 | Edwards | Oct. 27, 1942 |
| 2,339,469 | Emanuel | Jan. 18, 1944 |